United States Patent [19]

Lorenc et al.

[11] 3,767,571

[45] Oct. 23, 1973

[54] OIL REMOVAL FROM WASTE WATERS

[75] Inventors: Walter F. Lorenc, Harvey; James A. Hyde, Downers Grove, both of Ill.

[73] Assignee: Nalco Chemical Company, Chicago, Ill.

[22] Filed: Dec. 17, 1969

[21] Appl. No.: 885,990

[52] U.S. Cl.............. 210/30, 210/40, 210/DIG. 21
[51] Int. Cl............................................. B01d 15/06
[58] Field of Search...................... 210/36, 40, 222, 210/223, DIG. 21

[56] References Cited
UNITED STATES PATENTS

| | | | |
|---|---|---|---|
| 2,367,384 | 1/1945 | Tymstra et al. | 210/36 |
| 3,358,838 | 12/1967 | Kosar et al. | 210/223 X |
| 3,717,573 | 2/1973 | Warren | 210/40 |
| 3,142,638 | 7/1964 | Blaisdell et al. | 210/52 |
| 3,635,819 | 1/1972 | Kaiser | 210/40 |

*Primary Examiner*—Charles N. Hart
*Assistant Examiner*—Ivars Cintins
*Attorney*—John G. Premo, Charles W. Connors and Edward A. Ptacek

[57] ABSTRACT

A process for the removal of oil and oily organic contaminants from waste waters using magnetite ($Fe_3O_4$) is disclosed.

7 Claims, No Drawings

OIL REMOVAL FROM WATERS

INTRODUCTION

Waste waters containing either dispersed or emulsified oil present a disposal problem. Due to the recent stress on water pollution, these waste waters cannot be emptied into our streams, etc. There is a need to develop an adequate and efficient process for removing this oil. In the past, adsorbents such as asbestos have been used for this purpose. The main problem associated with light asbestos particles and similar adsorbents is that they cannot be easily removed from the waste water. Chemicals are often needed to form a floc of the asbestos so that it will rise to the top of the waste water treating area and can be separated by skimming, centrifugation and other appropriate means.

It would be a great advantage to the art if a process could be devised in which this oil could be adsorbed and the adsorbent efficiently removed from the waste water.

It would be a further advantage to the art if this adsorbent was relatively heavy so that it would sink to the bottom of the waste treatment tank.

It would be a further advantage to the art if chemical treatment was not needed along with the adsorbent.

THE INVENTION

In order to accomplish the above goals which are the objects of this invention, an aqueous liquid which contains suspended or dispersed oil or oily organic contaminants can be treated with magnetite particles. The process of treating aqueous liquids for the purpose of clarification comprises the steps of:

1. adding the magnetite particles to the aqueous liquids;
2. agitating the aqueous liquid and the magnetite particles thoroughly;
3. contacting the oil and the magnetite so as to provide adsorption; and
4. removing the magnetite particles containing the adsorbed oil.

There are many convenient methods of removing the magnetite particles after adsorption. These methods may be filtration, magnetic means, settling, etc. The magnetite can be regenerated using different solvents to extract the oil or other organic contaminants. The organic contaminants could also be removed by burning. The magnetite particles would lose some activity but could be returned to the aqueous liquid for further adsorption.

The particular substance used in the preferred embodiment of this invention is magnetite. Other oxides of iron have been tried separately, such as $Fe_2O_3$ and $FeO$ but have not been found as effective as the $Fe_3O_4$, which is the combination of $FeO$ and $Fe_2O_3$.

The magnetite particles should have a measurement in one direction within the range of from 1 to 100 microns and preferably within the range of from 20–60 microns; and more preferably about 45 microns.

A particularly preferred magnetite particulate substance which is readily available and economical are those oxides of iron produced as a by-product in the oxygen blowing of iron and in the oxygen openhearth process to produce steel. These by-products are commercially available from many steel mills and are supplied as particulates which contain 80% magnetite. A preferred group of these materials are fine iron oxide powders which contain approximately 80% by weight of magnetite and which have an average particle size ranging from 20–60 microns.

Still further species of highly effective magnetite particles may be found among clays which have been treated so that their component particles have at least a monomolecular coating of $Fe_3O_4$. The amount of magnetite used will vary from as little as 5 ppm to as much as 3,000–4,000 ppm depending upon the system treated and all other variables such as type of contaminant. Routine experimentation can readily determine the optimum quantities.

This invention can be better understood by reference to the following examples.

EXAMPLE I

A waste water containing 500 parts per million of oil (an anionic, emulsified oil) was rapidly mixed at turbulent conditions with magnetite at a ratio of 40:1 by weight, of magnetite to oil, for a period of ten minutes. Aliquot samples were removed each minute and analyzed for total carbon on a Total Carbon Analyzer. The carbon content remained constant at 16.5 ppm at 2 to 10 minutes. A hexane extractable test was also run and showed only 2 ppm oil remaining in the water. The hexane extractable test consists of mixing a known amount of hexane with an aliquot sample of the waste water. The liquids are allowed to separate. The hexane layer containing the oil is heated in a tared beaker to drive off hexane. The oil content of the original sample can then be calculated.

EXAMPLE II

A waste water containing 500 ppm oil (an anionic, emulsified oil) required a ratio of 20:1 by weight of magnetite to oil. The carbon content was reduced to less than 10 ppm. Likewise, a cationic oil was also tested and required only a ratio of 5:1 by weight of magnetite to oil. The carbon content as determined by a Total Carbon Analyzer was less than 10 ppm.

The ratio of magnetite to oil can vary from 1:1 to 100:1 by weight.

As previously stated, the magnetite can be separated from the effluent water by magnetic devices, centrifugation, settling, or filtration. The oil can be removed from the magnetite by solvent extraction, burning, volatilization, steam stripping, chemical cleansers, pH control, or biological methods. The regenerated magnetite can then be recycled through the system. A convenient method of removing the magnetite particles is by the use of a magnetic field of sufficient flux density to attract the particles. The aqueous liquid so treated is then removed from the area of the magnetic field, thereby providing a relatively clear liquid, or a liquid containing substantially less oil than was present before the treatment.

Another magnetic means of removing the magnetite is by magnetic drum separators.

Rapid turbulent mixing is necessary to effect efficient oil removal by contacting the oil droplets with the adsorbent.

A further understanding of the invention can be achieved by reference to the following table.

TABLE I

| Sx No. | Amt. oil added | Ratio magnetite/oil | Hexane (ppm) Influent | Hexane (ppm) Effluent | Total carbon (ppm) Influent | Total carbon (ppm) Effluent |
|---|---|---|---|---|---|---|
| 1 | 100 | | | | | |
| 2 | 500 | 40:1 | 309 | 1.6 | 313 | 16.8 |
| 3 | 1,000 | 20:1 | 788 | 8 | | 36 |
| 4 | 100 | 10:1 | 73 | 8.2 | 64 | 6.2 |
| 5 | 500 | 10:1 | | | 345 | 32 |
| 6 | 1,000 | 10:1 | 851 | 5.2 | 550 | 7.5 |
| 7 | 100 | | | | | |
| 8 | 500 | 10:1 | 352 | 3.2 | 320 | 2 |
| 9 | 1,000 | 10:1 | 772 | 0.2 | | |
| 10 | 1,000 | 2.5:1 | | 207 | | |
| 11 | 1,000 | 5:1 | | 128 | | |
| 12 | 1,000 | 7.5:1 | | 47.6 | | |
| 13 | 1,000 | 10:1 | | 18.8 | | |
| 14 | 25 | 100:1 | | 0 | | |
| 15 | 50 | 50:1 | | 0 | | |
| 16 | 250 | 10:1 | | 6.6 | | |
| 17 | 500 | 5:1 | | 98 | | |
| 18 | 1,250 | 2:1 | | 275 | | |
| 19 | 2,500 | 1:1 | | 247 | | |
| 20 | 10,000 | 0.25:1 | | 5,909 | | |
| 21 | 250 | 10:1 | | 4.8 | | |
| 22 | 500 | 5:1 | | 56 | | |
| 23 | 1,000 | 2.5:1 | | 157 | | |
| 24 | 2,500 | 1:1 | | 1,219 | | |
| 25 | 5,000 | 0.5:1 | | 3,232 | | |
| 26 | 10,000 | 0.25:1 | | 7,435 | | |

As noticed from this table, the amount of oil added was higher than the actual amount of oil in the influent as determined by the hexane and the Total Carbon methods. One reason for this is the fact that some of the oil added may adhere to the sides of the container and thus the oil content in the influent will be less.

Another reason that the hexane extraction does not account for the total amount of oil added is that the oil contained emulsifying agents that are not soluble in hexane. One of the reasons the total carbon analysis does not account for the total amount of oil added by weight is that the total carbon analyzer records results as ppm carbon. The oil added is not 100% carbon, and therefore, the carbon analyzer only records the percentage of oil which is actually carbon.

The samples in Table II were run to determine the effect of mixing. After the magnetite was added, samples were taken every minute for ten minutes. The samples were then analyzed for total carbon. The results are listed. The magnetite was separated using filtration, centrifugation, and magnetic means.

Table III lists the effects of regeneration. The test consists of adding the magnetite according to the process of this invention. The saturated magnetite was then separated by filtration and the adsorbed oil was removed using the specific solvent listed in the table. The regenerated magnetite was then recycled and treated as fresh magnetite according to the process of this invention. This regeneration cycle can be continued until the desired oil removal is no longer attainable.

TABLE III.—REGENERATION

| Sx No. | Ratio (magnetite/oil) | Solvent used for regenerating | Influent—oil* content in ppm determined by Hexane ext. | Influent—oil* content in ppm determined by TC | Effluent—oil content in ppm determined by Hexane ext. | Effluent—oil content in ppm determined by TC |
|---|---|---|---|---|---|---|
| 1 | 10:1 | | 1,784 | 1,130 | 10.6 | 70 |
|   | 10:1 | Naptha | 1,784 | 1,130 | 14.6 | 70 |
| 2* | 10:1 | | 851 | 550 | 11.4 | |
|   | 10:1 | Naptha | 851 | 550 | 219 | |
|   | 10:1 | ...do... | 851 | 550 | 251 | |
|   | 10:1 | ...do... | 851 | 550 | 290 | |
|   | 10:1 | Acetone | 851 | 550 | 123 | |
|   | 10:1 | ...do... | 851 | 550 | 125 | |
| 3** | 10:1 | | 851 | | 6 | |
|   | 10:1 | 1,1,1-Trichloroethane | 851 | | 166 | |
|   | 10:1 | ...do... | 851 | | 206 | |
|   | 10:1 | ...do... | 851 | | 231 | |
|   | 10:1 | Acetone | 851 | | 149 | |
|   | 10:1 | ...do... | 851 | | 166 | |

*The oil is a paraffinic, nonionic, emulsified rolling oil.
**1000 ppm by weight of a paraffinic, nonionic, emulsified rolling oil was added to the influent.

Lastly, Table IV shows the effect of high temperatures. These tests were performed to determine if heat would affect the oil adsorption capacity of magnetite. This shows that there is a substantial loss in adsorption capacity due to heat treatment. The heat oxidizes the surface of the magnetite and thus decreases the oil adsorption capacity.

Therefore, if heat was used after adsorption to volatilize the lower boiling organic contaminants, the heat would substantially reduce the adsorption capacity of the magnetite. Although heat regeneration might be economically feasible, the regenerated magnetite would have much less adsorption capacity.

TABLE II

TC ppm carbon after treatment

| | Approximately 1000 ppm emulsified nonionic oil was added to the water before treatment | | | | | | | | | Approximately 500 ppm nonionic oil was added to the water before treatment | | | | | |
|---|---|---|---|---|---|---|---|---|---|---|---|---|---|---|---|
| Min. | Sample No. 1, ratio 10:1 | Sample No. 2, ratio 5:1 | Sample No. 3, ratio 2.5:1 | Sample No. 4,[3] ratio 20:1 | Sample No. 5,[3] ratio 10:1 | Sample No. 6,[1] ratio 20:1 | Sample No. 7,[1] ratio 10:1 | Sample No. 8,[1] ratio 10:1 | Sample No. 9,[2] ratio 5:1 | Sample No. 10,[4] ratio 40:1 | Sample No. 11,[5] ratio 20:1 | Sample No. 12,[5] ratio 10:1 | Sample No. 13,[5] ratio 30:1 | Sample No. 15,[6] ratio 20:1 | Sample No. 16,[4] ratio 20:1 |
| 1 | 16.8 | 106 | 82 | 4.5 | 7.4 | 59.4 | 172 | | 0 | 33.6 | 22.8 | 80 | 11.6 | 133 | 177 |
| 2 | 11.6 | 90 | 82 | 3.5 | 6.4 | 53.4 | | 97 | 0 | 16.8 | 12.3 | 61.4 | 9.8 | 77 | 139 |
| 3 | 8.9 | 68.5 | 82 | 4.0 | 6.9 | 53.4 | 82 | 86 | 0 | 16.8 | 11.8 | 57.4 | 9.2 | 60 | 143 |
| 4 | 8.2 | 67 | 78 | 3.8 | 6.9 | 54.2 | | 78.7 | | 17.0 | 9.7 | 39.8 | 10.9 | 51.5 | 127 |
| 5 | 7.2 | 71.5 | 75 | 3.5 | 6.9 | 52.6 | | 71 | 0 | 16.6 | 11.1 | 37.4 | 9.3 | 45 | 129 |
| 6 | 6.7 | 70.5 | 73 | 3.3 | 6.4 | 54.2 | | 71 | | 17.6 | 9.7 | 40.6 | 9.9 | 39.5 | 129 |
| 7 | 7.2 | 68.5 | 73 | 3.3 | 6.7 | 53.4 | 69 | 69 | 1 | 16.8 | 9.7 | 36.6 | 10.8 | 42.5 | 95 |
| 8 | 7.2 | 66 | 69 | 3.5 | 6.4 | 54.2 | | 69.5 | | 18.0 | 9.2 | 32.6 | 10.3 | 39 | 107 |
| 9 | 7.7 | 63 | 68 | 3.3 | 5.8 | | | 66.5 | | 16.7 | 9.4 | 31.0 | 10.3 | 36 | 105 |
| 10 | | | 69 | 2.8 | 5.8 | 51.8 | 69 | 66.5 | 0 | 16.5 | 9.2 | 30.4 | 10.1 | | 88 |

[1] The oil used in these samples was an anionic, emulsified, industrial waste oil that contained 1784 ppm hexane extractibles.
[2] The oil used in this sample was an anionic oil that was easily separated from the water.
[3] Approximately 100 ppm emulsified nonionic oil was added to the water before treatment.
[4] This was an anionic emulsified oil.
[5] The magnetite was separated using magnetic means.
[6] Approximately 1000 ppm nonionic oil was added to the water before treatment.

TABLE IV.—EFFECT OF TEMPERATURE—RATIO OF MAGNETITE/OIL 10:1

| Sample No. | Temperature | Influent oil content in ppm determined by hexane ext. | Effluent oil content in ppm determined by hexane ext. |
|---|---|---|---|
| 1 | Ambient | 851 | 11.0 |
| 2 | 300° C | 851 | 60.0 |
| 3 | 400° C | 851 | 118.0 |

SUMMARY

A very effective process for removing oil and other organic contaminants from waste water is disclosed. Magnetite can be used as an adsorbent to remove such contaminants from waste waters. The process to accomplish such removal comprises adding the magnetite followed by thorough agitation to bring about contact between the oil and the magnetite. The magnetite containing the adsorbed contaminants can then be removed by any convenient method such as filtration, centrifugation, magnetic means, etc. The magnetite can be regenerated if desired.

We claim:

1. A process for the clarification of aqueous liquids which contain suspended and dispersed oil which comprises the steps of:
   A. adding magnetite particles to said aqueous liquids;
   B. contacting the oil and the magnetite by thoroughly agitating the aqueous liquid and the magnetite particles to provide adsorption; and
   C. removing the magnetite particles containing the adsorbed oil.

2. The process of claim 1 in which the removal of the magnetite particles is by filtration.

3. The process of claim 1 in which the removal of the magnetite particles is by magnetic means.

4. The process of claim 1 which includes the additional step of:
   regenerating the magnetite by removing the oil.

5. The process of claim 4 in which the removal of the oil is achieved by solvent extraction.

6. The process of claim 4 in which the removal of the oil is achieved by burning.

7. The process of claim 4 in which the regenerated magnetite is returned to the aqueous liquid for further adsorption of the oily waste.

* * * * *